United States Patent
Gao

(10) Patent No.: US 12,498,360 B1
(45) Date of Patent: Dec. 16, 2025

(54) SOIL DETECTOR

(71) Applicant: Liping Gao, Yuyao (CN)

(72) Inventor: Liping Gao, Yuyao (CN)

( * ) Notice: Subject to any disclaimer, the term of this patent is extended or adjusted under 35 U.S.C. 154(b) by 0 days.

(21) Appl. No.: 19/206,360

(22) Filed: May 13, 2025

(51) Int. Cl.
*G01N 33/24* (2006.01)

(52) U.S. Cl.
CPC ......... *G01N 33/246* (2013.01); *G01N 33/245* (2024.05)

(58) Field of Classification Search
CPC .......................... G01N 33/246; G01N 33/245
See application file for complete search history.

(56) References Cited

U.S. PATENT DOCUMENTS

| | | | | |
|---|---|---|---|---|
| 3,968,428 A | * | 7/1976 | Numoto | G01R 27/14 324/696 |
| 2010/0277185 A1 | * | 11/2010 | Hughes | G01N 33/246 324/664 |
| 2015/0253277 A1 | * | 9/2015 | Wada | C23C 16/26 216/17 |
| 2021/0199609 A1 | * | 7/2021 | Futagawa | G01N 27/048 |
| 2025/0076249 A1 | * | 3/2025 | Branciforte | G01N 27/605 |
| 2025/0130194 A1 | * | 4/2025 | Huang | G01N 27/223 |

FOREIGN PATENT DOCUMENTS

| | | | | | |
|---|---|---|---|---|---|
| CN | 2295219 | Y | * | 10/1998 | |
| CN | 203840198 | U | * | 9/2014 | |
| CN | 109220738 | A | * | 1/2019 | ........... A01G 27/003 |
| CN | 109247227 | A | * | 1/2019 | ........... A01G 27/001 |
| CN | 210603428 | U | * | 5/2020 | |
| CN | 213903365 | U | | 8/2021 | |
| CN | 213903370 | U | | 8/2021 | |
| CN | 216926812 | U | | 7/2022 | |

OTHER PUBLICATIONS

CN-109220738-A (Year: 2019).*
CN-109247227-A (Year: 2019).*
CN-203840198-U (Year: 2014).*
CN-210603428-U (Year: 2020).*
CN-2295219-Y (Year: 1998).*

* cited by examiner

*Primary Examiner* — Fatemeh Esfandiari Nia
(74) *Attorney, Agent, or Firm* — Nitin Kaushik

(57) ABSTRACT

The present application discloses a soil detector, comprising a housing, a circuit board, and a probe; the circuit board is provided within the housing, and the probe extends into the housing and is electrically connected to the circuit board; a detection electrode is provided on the probe; a soil detection circuit is provided on the circuit board; when soil pH detection is performed, the probe is inserted into soil, and the soil detection circuit reads a time-varying amount of an electromotive force formed by the detection electrode in the soil by outputting a square wave alternating current voltage to the detection electrode, and determines a pH of the soil based on the time-varying amount of the electromotive force.

9 Claims, 8 Drawing Sheets

SOIL DETECTOR

TECHNICAL FIELD

The present application belongs to the technical field of soil parameter detection, in particular to a soil detector.

BACKGROUND

In agricultural production, the impact of health conditions of soil on the yield of the growing industry is critical. Monitoring soil parameters, acquiring soil health conditions and improving the soil in time are prerequisites for obtaining good harvests. Detection of soil parameters involves soil pH detection, soil moisture detection, and soil temperature detection, etc. Among them, the pH of the soil is particularly important as it directly determines whether the soil is suitable for crop growth. An existing detection method of a conventional soil detector is: inserting a probe into soil, applying a direct current voltage to both poles of the probe, reading a direct current voltage component of the probe while the probe is in the soil, and comparing with a reference map according to the direct current voltage component to obtain pH parameters of the soil. However, in this detection mode, the probe easily generates a polarization phenomenon under long-term use, resulting in blackening and oxidation of the probe, which in turn results in deviation of the detection parameters, resulting in inaccurate detection, and affecting accurate grasp of soil health conditions.

SUMMARY

In view of the above problems, the present application discloses a soil parameter detection to overcome the above problems or at least partially solve the above problems.

To achieve the foregoing purpose, the present application adopts the following technical solution:

According to one aspect of the present application, there is provided a soil detector, including: a housing, a circuit board, and a probe; the circuit board is provided within the housing, and the probe extends into the housing and is electrically connected to the circuit board;

a detection electrode is provided on the probe;

a soil detection circuit is provided on the circuit board; when soil pH detection is performed, the probe is inserted into soil, and the soil detection circuit reads a time-varying amount of an electromotive force formed by the detection electrode in the soil by outputting a square wave alternating current voltage to the detection electrode, and determines a pH of the soil based on the time-varying amount of the electromotive force.

In some embodiments, the detection electrode includes a first electrode provided at a front end of the probe and a second electrode provided at a root of the probe, and the first electrode and the second electrode are made of different metal materials;

the soil detection circuit includes a non-volatile microcontroller unit and a pH detection branch; two alternating current power supply output terminals of the non-volatile microcontroller unit are connected to the first electrode and the second electrode, respectively, to output the square wave alternating current voltage to the first electrode and the second electrode;

the pH detection branch includes a reference voltage module and a pH value acquisition module;

the reference voltage module includes a pull-up resistor R16 and a voltage-regulator diode U2; the pull-up resistor R16 and the voltage-regulator diode U2 are grounded in series from a power supply positive terminal, and a reference voltage terminal is provided for the pH value acquisition module by the voltage-regulator diode U2; the pH value acquisition module includes a resistor R9, a resistor R10, and a filter capacitor C6; a first terminal of the resistor R9 is connected to the first electrode, a second terminal is connected to a first terminal of the resistor R10, a second terminal of the resistor R10 is connected to the reference voltage terminal, and a connection terminal of the resistor R9 and the resistor R10 is connected to a pH detection terminal of the non-volatile microcontroller unit, and is grounded through the filter capacitor C6.

In some embodiments, the non-volatile microcontroller unit has stored therein executable instructions that, when executed, cause the non-volatile microcontroller unit to perform clipping filtering and debouncing filtering on electrical signals acquired from the pH detection branch.

In some embodiments, the soil detection circuit further includes a moisture detection branch; the moisture detection branch includes a resistor R17 and a resistor R6; a first terminal of the resistor R17 is connected to the second electrode and a first terminal of the resistor R6, a second terminal of the resistor R17 is grounded, and a second terminal of the resistor R6 is connected to a moisture detection terminal of the non-volatile microcontroller unit; when soil moisture detection is performed, the first electrode is connected to the power supply positive terminal.

In some embodiments, the detection electrode further includes a third electrode provided at a middle portion of the probe; the soil detection circuit further includes a fertility value detection branch; the fertility value detection branch includes a resistor R19 and a resistor R18; a first terminal of the resistor R18 is connected to the power supply positive terminal, a second terminal is connected to the third electrode and a first terminal of the resistor R19, and a second terminal of the resistor R19 is connected to a fertility value detection terminal of the non-volatile microcontroller unit; when soil fertility value detection is performed, the first electrode is connected to the power supply positive terminal.

In some embodiments, the soil detection circuit further includes four sets of toggle switches; a common terminal of first toggle switches is connected to the first electrode, a first moving terminal is connected to the power supply positive terminal, and a second moving terminal is connected to the first terminal of the resistor R9 and one alternating current power supply output terminal of the non-volatile microcontroller unit; a common terminal of second toggle switches is connected to the second electrode, a first moving terminal is connected to the first terminal of the resistor R6, and a second moving terminal is connected to another alternating current power supply output terminal of the non-volatile microcontroller unit; a common terminal of third toggle switches is grounded, a first moving terminal is connected to the non-volatile microcontroller unit, and a second moving terminal is suspended; a common terminal of fourth toggle switches is connected to the non-volatile microcontroller unit, a first moving terminal is connected to the second terminal of the resistor R6, and a second moving terminal is connected to the second terminal of the resistor R19; wherein the first toggle switches, the second toggle switches and the third toggle switches are linked.

In some embodiments, the circuit board is further provided with a power supply circuit and an on-off key;

the on-off key is grounded and turned on when pressed, the on-off key is connected to a power supply detection terminal of the non-volatile microcontroller unit, and the power supply detection terminal is connected to the power supply positive terminal via a pull-up resistor R29;

the power supply circuit is a zero power consumption circuit, including an anti-reverse diode D1, a transistor Q1, a transistor Q2, a voltage stabilizing chip U1 and a plurality of resistors; a battery positive electrode is connected to an emitter of the transistor Q2 through the anti-reverse diode D1; a base of the transistor Q2 is connected to an output terminal of the anti-reverse diode D1 via a resistor R27, and is connected to the on-off key via a resistor R24 and a resistor R28 in series, and a collector of the transistor Q2 is connected to the voltage stabilizing chip U1; a collector of the transistor Q1 is connected to a connection terminal of the resistor R24 and the resistor R28, an emitter of the transistor Q1 is grounded, and a base of the transistor Q1 is connected to the non-volatile microcontroller unit via the resistor R25 and is grounded via the resistor R26.

In some embodiments, the circuit board is further provided with a Bluetooth module, and the Bluetooth module is connected to the non-volatile microcontroller unit for allowing the soil detector to communicate with an external Bluetooth device.

In some embodiments, the circuit board is further provided with an auxiliary detection circuit, and the auxiliary detection circuit includes a temperature detection branch, an illumination detection branch and a battery voltage detection branch, and the temperature detection branch, the illumination detection branch and the battery voltage detection branch are all electrically connected to the non-volatile microcontroller unit.

In some embodiments, a display module is further provided on the circuit board, and the display module is connected to the non-volatile microcontroller unit for displaying soil detection parameters and operation states of the soil detector, and display brightness of the display module is adjusted with illumination intensity detected by the illumination detection branch.

The present application has the following advantages and beneficial effects:

The soil detector of the present application includes a housing, a circuit board, and a probe; the circuit board is provided within the housing, and the probe extends into the housing and is electrically connected to the circuit board; a detection electrode is provided on the probe; a soil detection circuit is provided on the circuit board; when soil pH detection is performed, the probe is inserted into soil, and the soil detection circuit reads a time-varying amount of an electromotive force formed by the detection electrode in the soil by outputting a square wave alternating current voltage to the detection electrode, and determines a pH of the soil based on the time-varying amount of the electromotive force. By loading the square wave alternating current voltage on the detection electrode of the probe, the present application realizes dynamic balance of a polarity of a power supply of the detection electrode, reduces a polarization speed of the detection electrode, can maintain a precise working state of the probe for a long period of time, and facilitates repairing and maintenance of the probe. Meanwhile, since the present application determines the pH parameters based on the time-varying amount of the electromotive force formed by the detection electrode under the square wave alternating current voltage, an absolute value reference is replaced with a relative value reference, effects of a decrease in battery power are avoided, and it is not necessary to repeatedly perform battery voltage calibration. Therefore, the detection stability and precision are higher, and more convenience is brought to use.

BRIEF DESCRIPTION OF THE DRAWINGS

Various other advantages and benefits will become apparent to those of ordinary skill in the art upon reading the following detailed description of the preferred embodiments. The accompanying drawings are only for the purpose of illustrating the preferred implementations and are not considered as limiting the present application. Throughout the accompanying drawings, the same reference numerals represent the same components. In the drawings.

Figure 1:
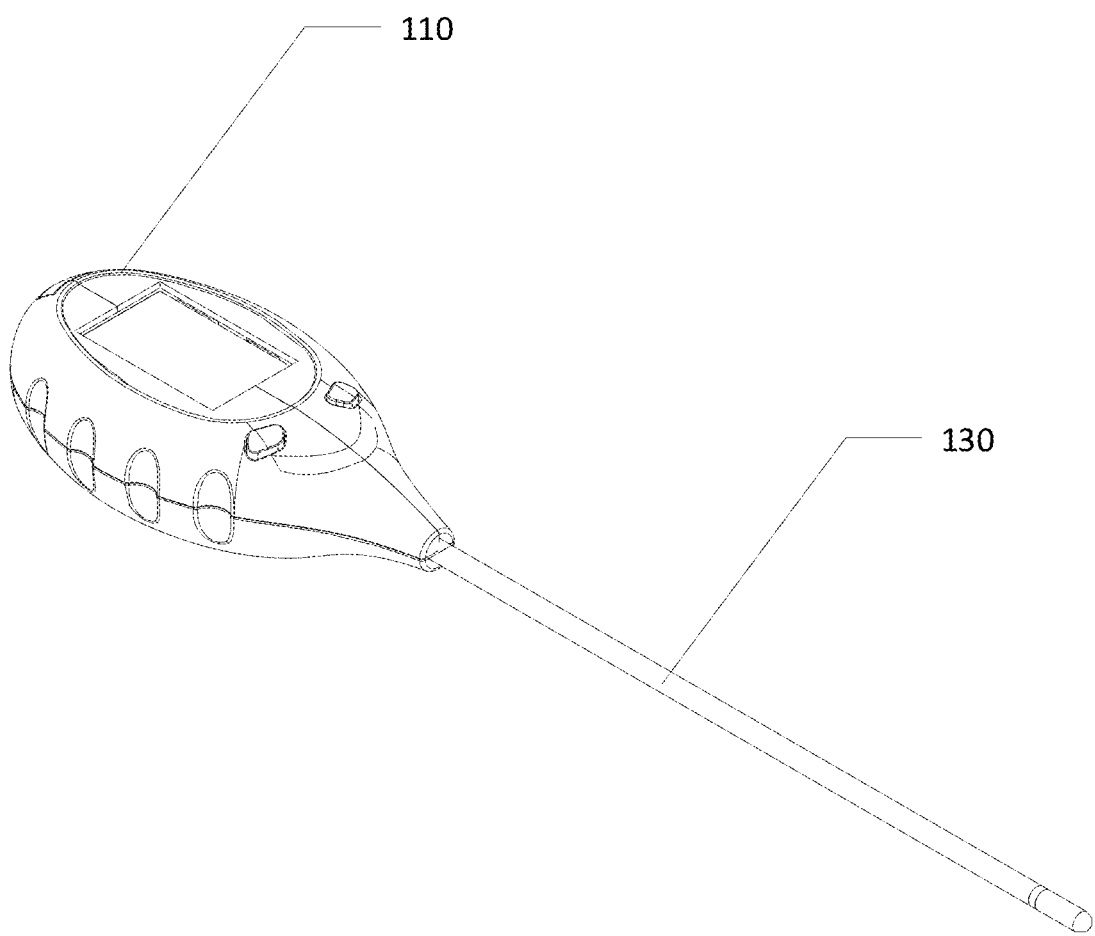
FIG. 1 is a perspective view of a complete appearance of a soil detector according to one embodiment of the present application.

In the drawings: 110, housing; 111, light transmissive cover; 120, circuit board; 130, probe; 131, first electrode; 132, second electrode; 133, third electrode; 410, pH detection branch; 420, moisture detection branch; 430, fertility value detection branch; 710, temperature detection branch; 720, illumination detection branch; 730, battery voltage detection branch.

DETAILED DESCRIPTION OF THE EMBODIMENTS

To make the purpose, technical solutions, and advantages of the present application clearer, the following clearly and completely describes the technical solutions of the present application with reference to the specific embodiments of the present application and corresponding accompanying drawings. Obviously, the described embodiments are only some but not all of the embodiments of the present application. All other embodiments obtained by a person of ordinary skill in the art based on the embodiments of the present application without creative efforts shall fall within the protection scope of the present application.

The technical solutions provided in the embodiments of the present application are described in detail below with reference to the accompanying drawings.

It should be noted that the embodiments and features in the embodiments of the present application may be combined with each other without conflict. The present application will be described in detail below with reference to the accompanying drawings and the embodiments.

It should be noted that the following detailed description is exemplary and intended to further illustrate the present application. Unless otherwise stated, all technical and scientific terms used herein have the same meaning as those commonly understood by those skilled in the art of the present application.

For ease of description, spatial relative terms, such as "on", "above", "upper surface", "over", and the like, may be used herein to describe a spatial positional relationship between one device or feature and another device or feature as shown in the figures. It should be understood that the spatial relative terms are intended to include different orientations in use or operation in addition to the orientation of the device depicted in the figures. For example, if the device in the accompanying drawing is inverted, the device described as "above the other devices or constructions" or "on the other devices or constructions" will be positioned as "below the other devices or constructions" or "under the other devices or constructions". Thus, the exemplary term "above" can include two orientations, namely, "above" and "under". The device may also be positioned and rotated 90 degrees in other different ways or located at other orientations, and the spatial relative descriptions used herein are interpreted accordingly.

It should be noted that the terms used herein are only for describing the embodiments rather than for limiting the exemplary embodiments of the present application. As used herein, unless otherwise stated clearly in the context, a singular form is intended to include a plural form thereof. In addition, it should be understood that the terms "comprise" and/or "include" as used herein indicate the presence of features, steps, operations, components, assemblies, and/or combinations thereof.

It should be noted that, the terms "first", "second", and so on in the description and claims of the present application and in the above accompanying drawings are intended to distinguish between similar objects but do not necessarily indicate a specific order or sequence. It should be understood that the data used in this way can be interchanged where appropriate so that implementations of the present application described herein may be implemented in an order other than those illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device.

FIG. 1 to FIG. 8 schematically illustrate one embodiment of the soil detector of the present application.

As shown in FIG. 1 to FIG. 8, the present application discloses a soil detector, including a housing 110, a circuit board 120, and a probe 130. The circuit board 120 is provided within the housing 110, and the probe 130 extends into the housing 110 and is electrically connected to the circuit board 120. A detection electrode is provided on the probe 130. A soil detection circuit is provided on the circuit board 120. When soil pH detection is performed, the probe 130 is inserted into soil, and the soil detection circuit reads a time-varying amount of an electromotive force formed by the detection electrode in the soil by outputting a square wave alternating current voltage to the detection electrode, and determines a pH of the soil based on the time-varying amount of the electromotive force.

With the above design, by loading the square wave alternating current voltage on the detection electrode of the probe 130, the soil detector of the present application realizes dynamic balance of a polarity of a power supply of the detection electrode, reduces a polarization speed of the detection electrode, can maintain a precise working state of the probe 130 for a long period of time, and facilitates repairing and maintenance of the probe 130. Meanwhile, since the present application determines the pH parameters based on the time-varying amount of the electromotive force formed by the detection electrode under the square wave alternating current voltage, an absolute value is replaced with a change amount of a relative value of the electromotive force, thus, effects of a decrease in battery power are avoided, and it is not necessary to repeatedly perform battery voltage calibration. Therefore, the detection stability and precision are higher, and more convenience is brought to use.

In some embodiments of the present application, the detection electrode includes a first electrode 131 (i.e., as shown by Pin 1 of P2 in FIG. 4) provided at a front end of the probe 130 and a second electrode 132 (i.e., as shown by Pin 2 of P2 in FIG. 4) provided at a root of the probe 130, and the first electrode 131 and the second electrode 132 are made of different metal materials. A detection principle of the probe 130 is: using two different metal electrodes on the probe 130 to form a conductor in soil to generate an induced electromotive force; determining a current pH of the soil by reading potential difference parameters, that is, voltage difference value parameters of the metal electrodes at a pre-applied voltage in the soil at different pH levels and comparing them with voltage parameters inside the soil detector.

Figure 3:
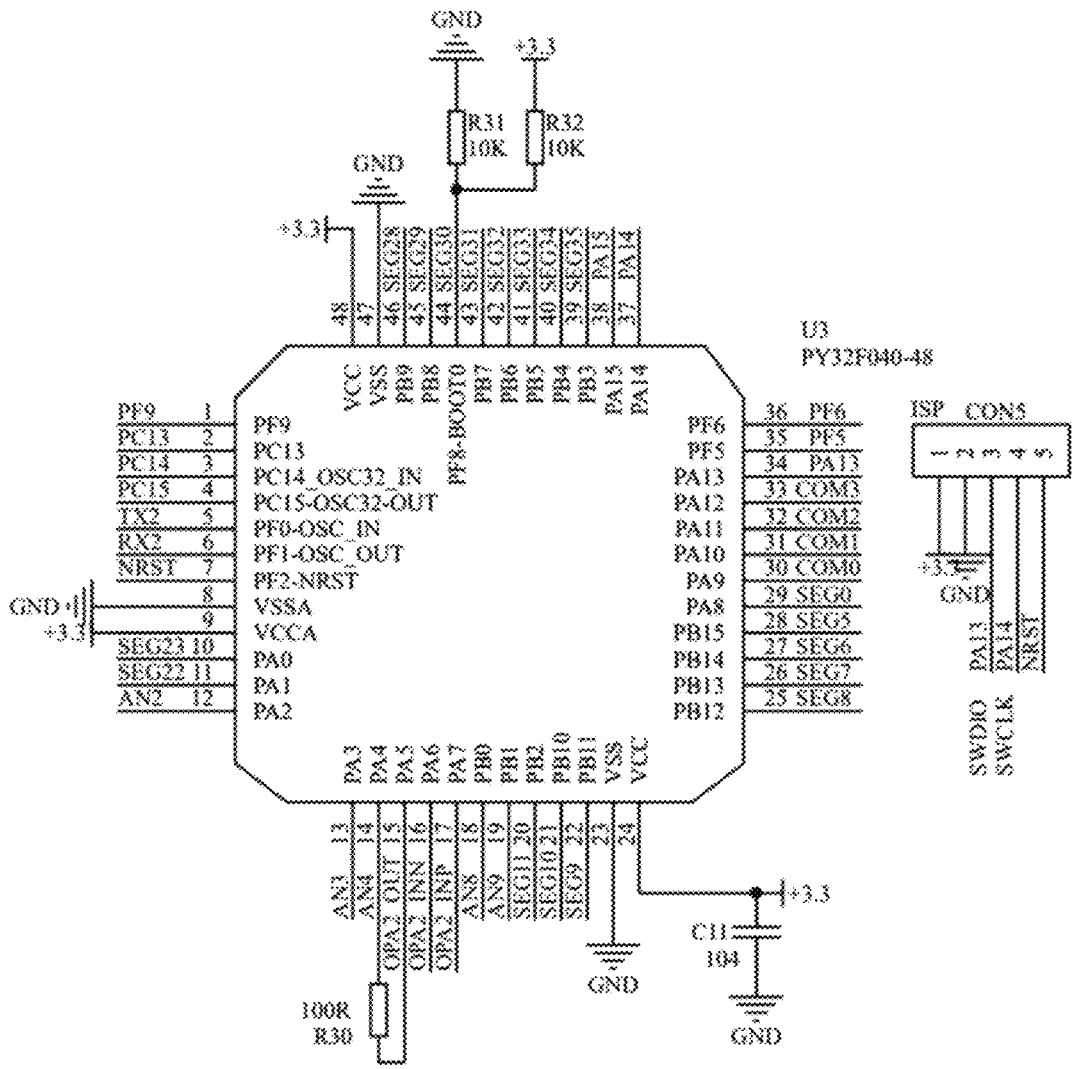
FIG. 3 is a schematic circuit diagram of a non-volatile microcontroller unit of a soil detector according to one embodiment of the present application.
Figure 4:
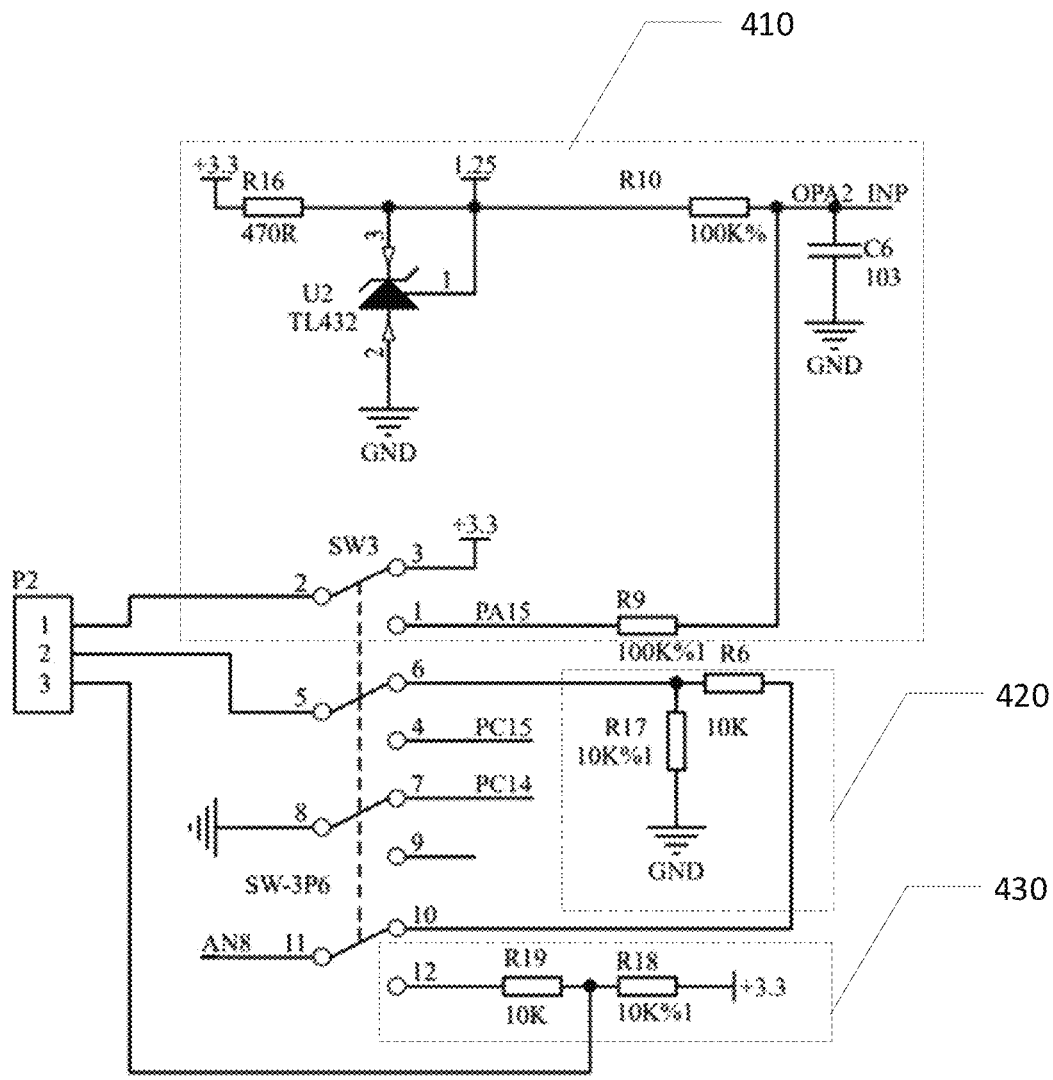
FIG. 4 is a schematic circuit diagram of a soil detection circuit of a soil detector according to one embodiment of the present application.

In some embodiments of the present application, as shown in FIG. 3 and FIG. 4, the soil detection circuit includes a non-volatile microcontroller unit U3 and a pH detection branch 410. Two alternating current power supply output terminals of the non-volatile microcontroller unit U3 (shown by network reference numerals PA15 and PC15 in FIG. 3 and FIG. 4) are connected to the first electrode and the second electrode, respectively, to output the square wave alternating current voltage to the first electrode and the second electrode. The soil detector of the present invention can form dynamic balance by inputting the square wave alternating current voltage to the probe 130 so that a voltage between the first electrode and the second electrode is periodically varied in positive and negative polarities. Thus, it is avoided that the first electrode and the second electrode are operated in a fixed power supply polarity state for a long period of time, so as to reduce the polarization phenomenon of the first electrode and the second electrode, and facilitate repairing and maintenance of the probe 130. The non-volatile microcontroller unit has a non-volatile memory to which instruction codes can be written to perform a detection method. For example, the present application uses a 32-bit microcontroller unit with a model of PY32F040-48, which has an analog-to-digital conversion ADC module and a digital-to-analog conversion DAC module inside, and has an operational amplifier unit for comparing a reference voltage with an acquired electromotive force difference to determine the pH of the soil.

Referring to FIG. 4, in one embodiment of the present application, the pH detection branch 410 includes a reference voltage module and a pH collection module. The reference voltage module includes a pull-up resistor R16 and a voltage-regulator diode U2. The pull-up resistor R16 and the voltage-regulator diode U2 are grounded in series from the power supply positive terminal (i.e., the +3.3 V voltage terminal), and a reference voltage terminal is provided for the pH value acquisition module through the voltage-regulator diode U2. For example, a reference voltage of 1.25 V is provided. The pH value acquisition module includes a resistor R9, a resistor R10, and a filter capacitor C6. A first terminal of the resistor R9 is connected to the first electrode, a second terminal is connected to a first terminal of the resistor R10, a second terminal of the resistor R10 is connected to the reference voltage terminal, and a connection terminal of the resistor R9 and the resistor R10 is connected to a pH detection terminal (i.e., Pin PA7 corresponding to a network reference numeral OPA2 INP) of the non-volatile microcontroller unit, and is grounded through the filter capacitor C6. The embodiment of the present application can acquire instantaneous feedback voltage signals at the reference voltage by outputting the square wave alternating current voltage to the first electrode and the second electrode by using the pH value acquisition module, thereby obtaining the relative varying amount of the potential difference as a function of time. Since the pH detection method of the present application does not use an absolute value of the potential difference but uses the time-varying amount of the potential difference to judge the pH of the soil by the change speed of the potential difference, the problem of offset due to the change in the voltage of the battery does not occur, making the pH detection more accurate, and avoiding the need of repeated calibration of the voltage many times.

In some embodiments of the present application, the non-volatile microcontroller unit has stored therein executable instructions that, when executed, cause the non-volatile microcontroller unit to perform clipping filtering and debouncing filtering on electrical signals acquired from the pH detection branch 410. Referring to FIG. 3, the non-volatile microcontroller unit is equipped with a burning interface ISP CON5 to facilitate program burning presetting. The clipping filter primarily limits the acquired voltage signals to a certain range for preventing test data anomalies caused by introduction of static electricity or other externally charged bodies into the probe 130 or soil. The debouncing filtering mainly prevents the issue that the probe 130 cannot be inserted into the soil once, resulting in the problem that there will be a lot of uncertainty in the middle, causing a lot of glitches in the induced electromotive force.

Since the instantaneous variate of the potential difference read by the pH detection module of the present application is small, interference can be effectively filtered out by clipping filtering. The clipping filtering algorithm is expressed, for example, by the following formula:

$$y(t) = \begin{cases} x(t) & |x(t)| \leq A \\ A \cdot \text{sgn}(x(t)) & |x(t)| > A \end{cases},$$

where y(t) is the output signals; A is a preset amplitude threshold; sgn(x(t)) is a sign function, which is 1 when x(t)>0 and is −1 when x(t)<0.

The debouncing filtering method of the embodiments of the present application may be implemented in software such as a non-volatile microcontroller unit executable delay debouncing statement (e.g., delay ( ) statement), which is well known to those skilled in the art, and will not be described in detail herein.

In some embodiments of the present application, the soil detection circuit further includes a moisture detection branch 420, which may be used to perform soil moisture detection. As shown in FIG. 4, the moisture detection branch 420 includes a resistor R17 and a resistor R6. A first terminal of the resistor R17 is connected to the second electrode and a first terminal of the resistor R6, a second terminal of the resistor R17 is grounded, and a second terminal of the resistor R6 is connected to a moisture detection terminal (i.e. Pin PB0 corresponding to a network reference numeral AN8) of the non-volatile microcontroller unit. When soil moisture detection is performed, the first electrode is connected to the power supply positive terminal. In the embodiment of the present application, by applying a voltage to the first electrode and the second electrode of the probe 130 and acquiring the voltage component by means of the moisture detection branch 420, an electrical conductivity of the soil can be determined, and a moisture content of the soil is extrapolated from the electrical conductivity, thereby achieving moisture detection.

In some embodiments of the present application, the detection electrode further includes a third electrode 133 provided in the middle portion of the probe 130, i.e., Pin 3 of P2 shown in FIG. 4. The third electrode 133 is made of different metal than the first electrode 131 and the second electrode 132. The soil detection circuit further includes a fertility value detection branch 430. The fertility value detection branch 430 includes a resistor R19 and a resistor R18. A first terminal of the resistor R18 is connected to the power supply positive terminal, a second terminal is connected to the third electrode and a first terminal of the resistor R19, and a second terminal of the resistor R19 is connected to a fertility value detection terminal of the non-volatile microcontroller unit. When soil fertility value detection is performed, the first electrode is connected to the power supply positive terminal. Since the third electrode 133 is provided at the middle position of the probe 130 and is closer to the first electrode 131, voltage signals representing the concentration of a soil salt solution at a deeper position of the soil can be more accurately detected for estimating a fertility value. Meanwhile, a resistor network formed by the resistor R19 and the resistor R18 is also different from a resistor network formed by the resistor R17 and the resistor R6, allowing further accurate acquisition of soil electrical conductivity information and extrapolation of the fertility value.

In some embodiments of the present application, the soil detection circuit further includes four sets of toggle switches. For example, a toggle switch SW3 and a toggle switch SW-3P6 shown in FIG. 4 are included. A common terminal (i.e., Pin 2) of first toggle switches is connected to the first electrode, a first moving terminal (i.e., Pin 3) is connected to the power supply positive terminal, and a second moving terminal (i.e., Pin 1) is connected to the first terminal of the resistor R9 and one alternating current power supply output terminal (i.e., PA15) of the non-volatile microcontroller unit. A common terminal (i.e., Pin 5) of second toggle switches is connected to the second electrode, a first moving terminal (i.e., Pin 6) is connected to the first terminal of the resistor R6, and a second moving terminal (i.e., Pin 4) is connected to another alternating current power supply output terminal (i.e., PC15) of the non-volatile microcontroller unit. A common terminal (i.e., Pin 8) of third toggle switches is grounded, a first moving terminal (i.e., Pin 7) is connected to the non-volatile microcontroller unit, and a second moving terminal (i.e., Pin 9) is suspended. A common terminal (i.e., Pin 11) of fourth toggle switches is connected to the non-volatile microcontroller unit, a first moving terminal (i.e., Pin 10) is connected to the second terminal of the resistor R6, and a second moving terminal (i.e., Pin 12) is connected to the second terminal of the resistor R19. The first toggle switches, the second toggle switches and the third toggle switches are linked to implement soil pH detection switching. Fourth switches are relatively independently movable for switching soil moisture detection and fertility detection. Its operation principle is that pH detection is achieved when Pin 2 is connected to Pin 1, Pin 5 is connected to Pin 4, and Pin 8 is connected to Pin 9 through the toggling switch SW3. At this time, Pin 1 of P2 (referring to the first electrode) is connected to an interior of the non-volatile microcontroller unit through R9, enabling instantaneous acquisition of the voltage signals via the pH detection branch 410. Ports PA15 and PC15 of the non-volatile microcontroller unit are used to generate square waves which are output to the first electrode and the second electrode for pH detection. Soil moisture is detected when Pin 2 of the toggle switch SW3 is connected to Pin 3, Pin 5 is connected to Pin 6, Pin 8 is connected to Pin 7, and Pin 11 of the toggle switch SW-3P6 is connected to Pin 10. On the basis of moisture detection, i.e., on the basis that Pin 2 of the toggle switch SW3 is connected to Pin 3, Pin 5 is connected to Pin 6, and Pin 8 is connected to Pin 7, when the toggle switch SW-3P6 is controlled to switch to the state that Pin 11 is connected to Pin 12, the soil fertility value is detected instead. Soil fertility value detection and moisture detection share one AN8 port.

Figure 5:
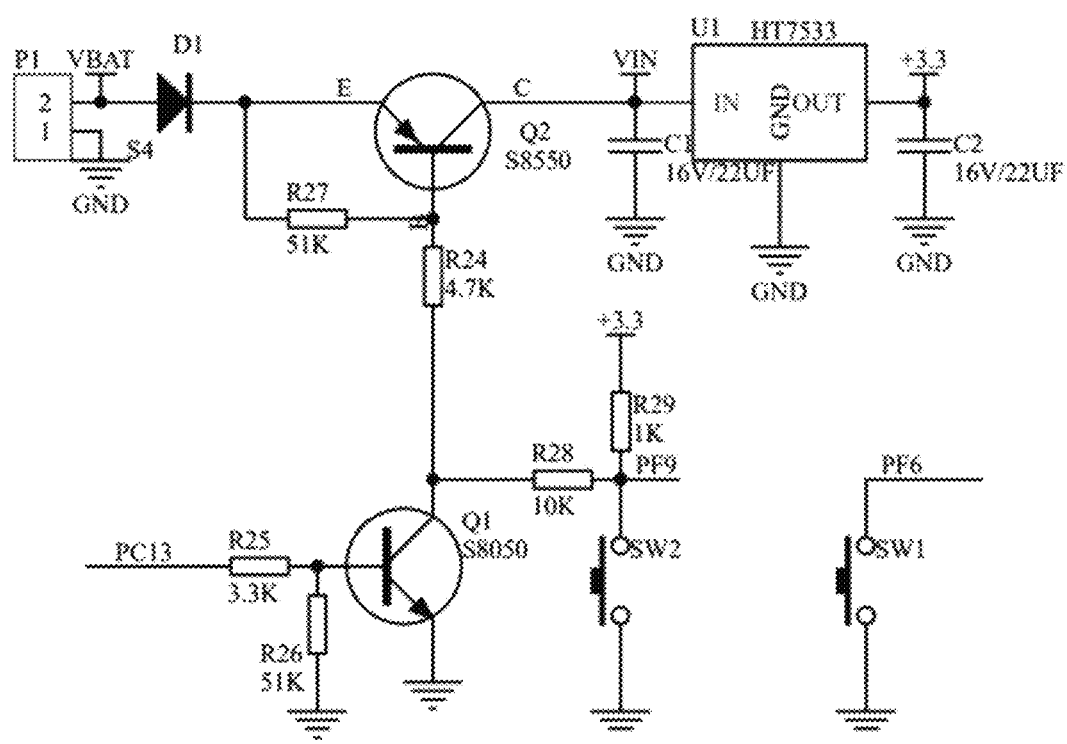
FIG. 5 is a schematic circuit diagram of a power supply circuit of a soil detector according to one embodiment of the present application.

In some embodiments of the present application, referring to FIG. 5, the circuit board 120 is further provided with a power supply circuit and an on-off key SW2. The on-off key is grounded and turned on when pressed, and the on-off key is connected to a power supply detection terminal of the non-volatile microcontroller unit. Meanwhile, the power supply detection terminal is connected to the power supply positive terminal through a pull-up resistor R29. On the basis that the general input output pin PF9 of the non-volatile microcontroller unit is turned on at a low level, the above circuit can realize a fast reaction to power supplying. Referring to FIG. 5, the power supply circuit is a zero power consumption circuit, and includes an anti-reverse diode D1, a transistor Q1, a transistor Q2, a voltage stabilizing chip U1 and a plurality of resistors. The battery positive electrode is connected to the emitter of the transistor Q2 through the anti-reverse diode D1 for preventing the battery from being reversed, and protecting safety of devices. The base of the transistor Q2 is connected to the output terminal of the anti-reverse diode D1 via a resistor R27, and is connected to the on-off key via a resistor R24 and a resistor R28 in series, the collector of the transistor Q2 is connected to the voltage stabilizing chip U1, the voltage stabilizing chip U1 is used for outputting the power supply voltage, and its input and output terminals implement ground filtering using a capacitor C1 and a capacitor C2, respectively. In the illustrated embodiment of the present application, the voltage stabilizing chip U1 is used for outputting a power supply voltage of +3.3 V. The collector of the transistor Q1 is connected to the connection terminal of the resistor R24 and the resistor R28, the emitter of the transistor Q1 is grounded, and the base of the transistor Q1 is connected to the non-volatile microcontroller unit (i.e., Pin PC13) through the resistor R25 and grounded through the resistor R26. When the on-off key SW2 is not pressed, the PNP transistor Q2 is not turned on due to the presence of the resistor R27, so that the voltage stabilizing chip U1 downstream of it does not operate. When the on-off key SW2 is pressed and turned on, the anti-reverse diode D1, the resistor R27, the resistor R24 and the resistor R28 form a path, a difference between a base voltage and an emitter voltage of the transistor Q2 is greater than 0.3 V, so that the transistor Q2 is turned on, the voltage stabilizing chip U1 is operated, and the non-volatile microcontroller unit is initialized to start to operate. At this time, Pin PC13 of the non-volatile microcontroller unit outputs a high level to turn on the transistor Q1, thereby maintaining the turn-on of the transistor Q2. In this process, the turn-on time can be preset, the non-volatile microcontroller unit is controlled to start timing, and when a certain time is reached, output of Pin PC13 is changed to a low level, and the transistor Q1 is turned off, thereby promoting the transistor Q2 to be turned off, and enabling the soil detector to be powered down to restore the initial state, so as to turn off in time to save power. The timed turn-off time can be customized by allowing the user to set the desired turn-off time to accommodate different scenarios. For example, a user may set a preset turn-off time, leave after inserting one soil detector and continue to insert another soil detector, and the inserted soil detector may automatically acquire soil parameters within the set time, record them and then be turned off for subsequent recovery of statistics by the user. Further, in the timing process of the non-volatile microcontroller unit, a watchdog program may be added, so that the timing is restarted if the on-off key SW2 is pressed again to meet the special operation duration needs of the detection person. Since the power supply circuit of the embodiments of the present application is turned off when the transistor Q2 is not turned on, the voltage stabilizing chip U1 and the non-volatile microcontroller unit are not operated, so that there is no power consumption, and such circuit is referred to as a zero power consumption circuit.

Further, with continued reference to FIG. 5, in an embodiment of the present application, the circuit board may also be provided with a mode selection key SW1 to control other modes of operation of the non-volatile microcontroller unit. As shown in FIG. 5, the mode selection key SW1 is grounded and turned on when pressed, and the mode selection key SW1 is connected to a mode selection terminal PF6 of the non-volatile microcontroller unit for realizing mode switching.

Figure 6:
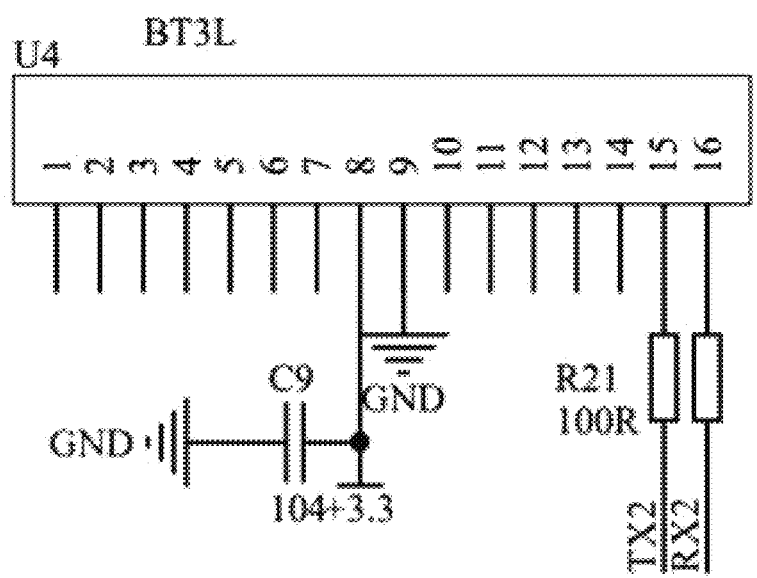
FIG. 6 is a schematic circuit diagram of a Bluetooth module of a soil detector according to one embodiment of the present application.

In some embodiments of the present application, as shown in FIG. 6, the Bluetooth module is further provided on the circuit board 120, and the Bluetooth module includes a Bluetooth communication chip U4 BT3L, and a capacitor C9 and a resistor R1, etc., which are matched with the Bluetooth communication chip. The Bluetooth module is connected to the non-volatile microcontroller unit for allowing the soil detector to communicate with an external Bluetooth device for transmitting soil detection data and facilitating soil networking detection and synchronization recording. For example, with the Bluetooth module with low power consumption is adopted, and a Bluetooth frequency band is 2.4 GHz. The user carries a smart mobile terminal himself, and can control the soil detector to work through an application program on the smart mobile terminal. The working state of the soil detector and the acquired data can also be transmitted to the smart mobile terminal through the Bluetooth module to interact with the smart mobile.

Figure 2:
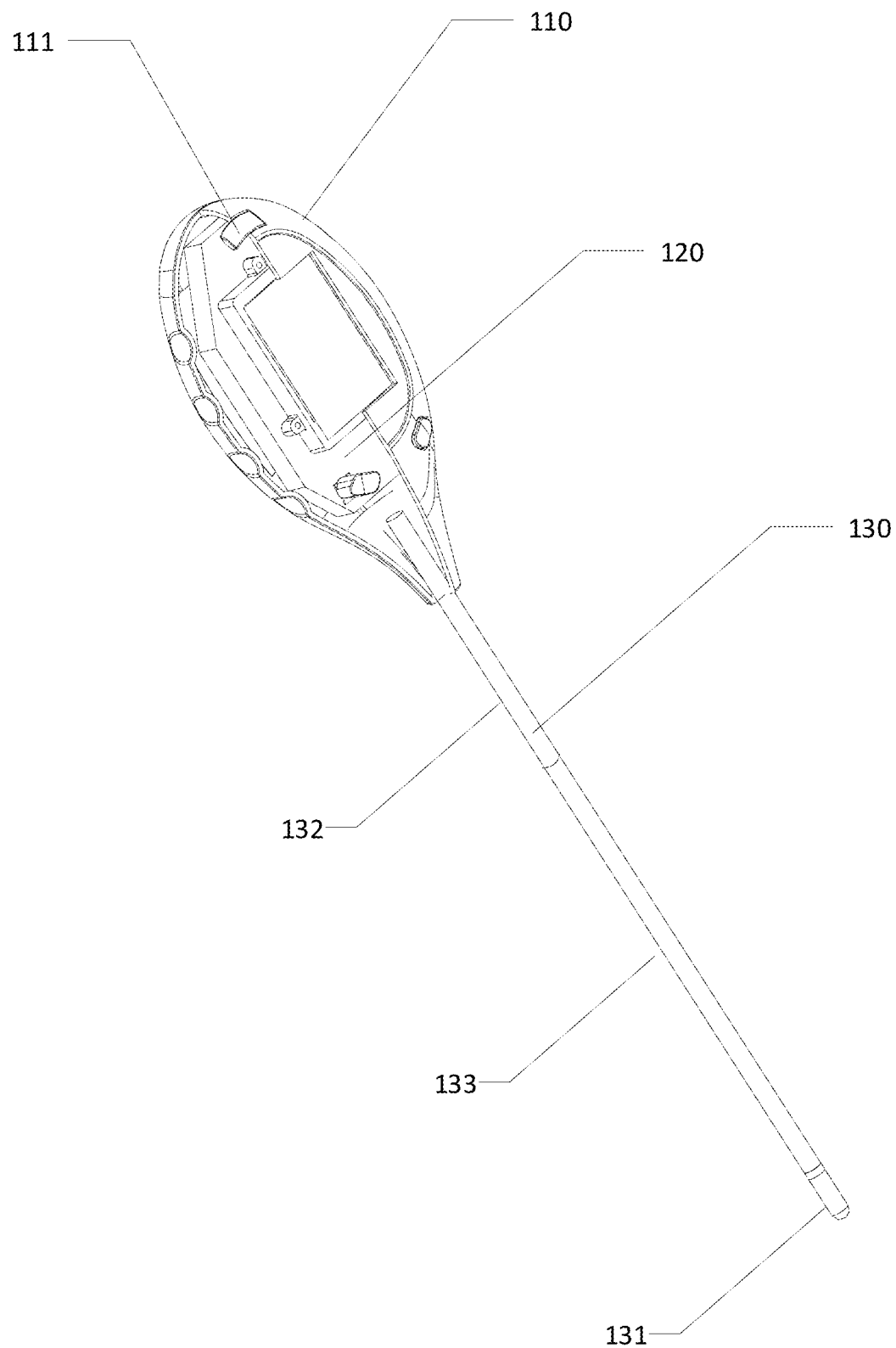
FIG. 2 is a perspective view of a soil detector with a portion of a housing removed according to one embodiment of the present application.
Figure 7:
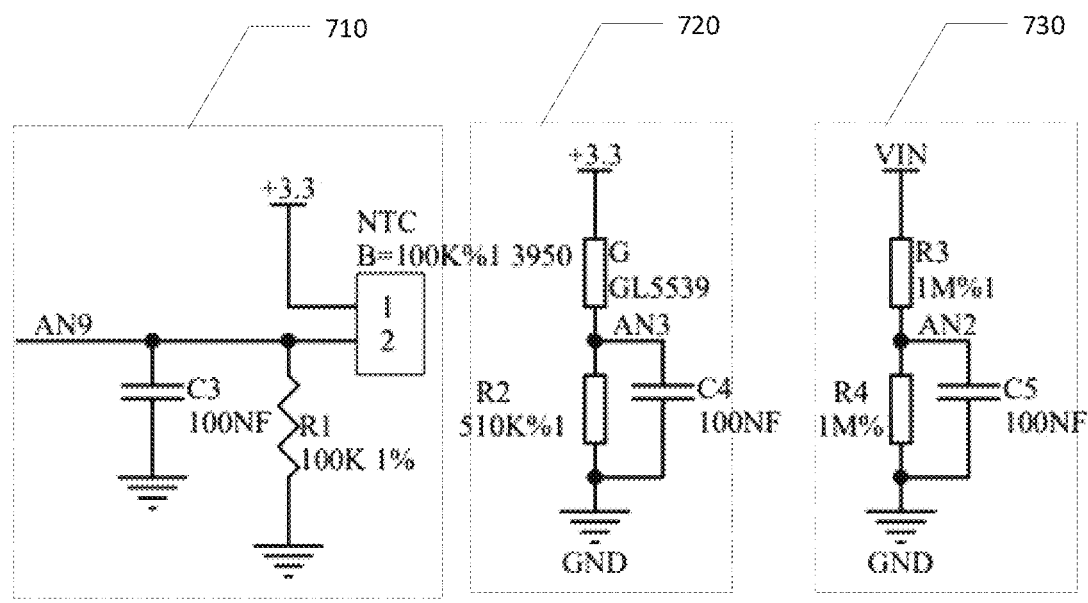
FIG. 7 is a schematic circuit diagram of an auxiliary detection circuit of a soil detector according to one embodiment of the present application.

In some embodiments of the present application, as shown in FIG. 7, an auxiliary detection circuit is also provided on the circuit board. The auxiliary detection circuit includes a temperature detection branch 710, an illumination detection branch 720 and a battery voltage detection branch 730, and the temperature detection branch 710, the illumination detection branch 720 and the battery voltage detection branch 730 are all electrically connected to the non-volatile microcontroller unit. The temperature detection branch 710 includes a temperature sensor NTC, a first terminal of the temperature sensor NTC is connected to the power supply positive terminal, and a second terminal is connected to a temperature sensing terminal AN9 of the non-volatile microcontroller unit, and is grounded for filtering through an RC network composed of a capacitor C3 and a resistor R1. The illumination detection branch 720 includes a photoresistor GL5539, a first terminal of the photoresistor is grounded, and a second terminal is connected to the illumination detection terminal AN3 of the non-volatile microcontroller unit, and grounded through an RC network composed of a resistor R2 and a capacitor C4. Referring to FIG. 1 and FIG. 2, a photoresistor is installed at the top of the soil detector and under the light transmissive cover 111 for achieving ambient light detection. The battery voltage detection branch 730 includes a voltage dividing resistor R3, a first terminal of the voltage dividing resistor R3 is connected to the input terminal of the voltage stabilizing chip U1 (i.e., the collector output terminal of the transistor Q2), a second terminal is connected to the battery voltage detection terminal AN2 of the non-volatile microcontroller unit and grounded through an RC network composed of a resistor R4 and a capacitor R5.

Figure 8:
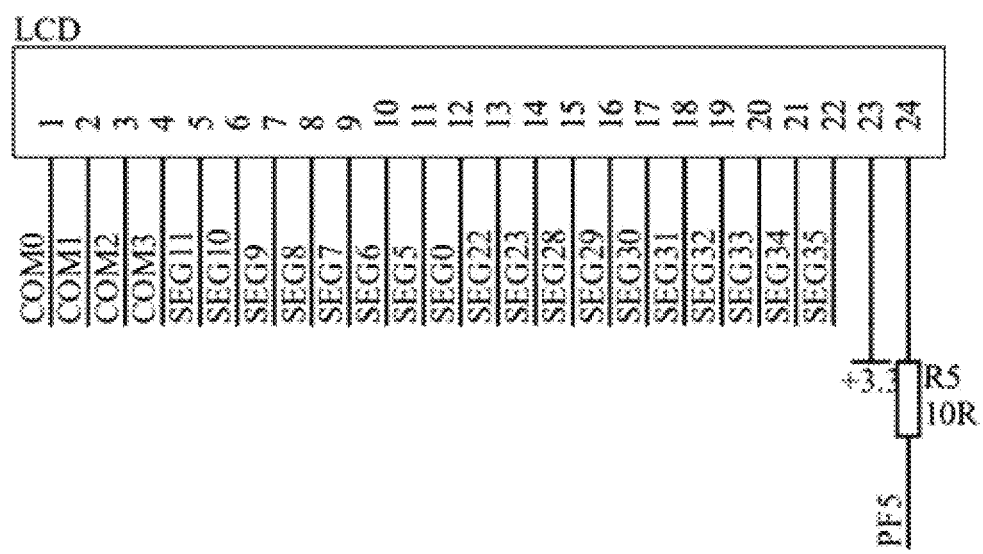
FIG. 8 is a schematic circuit diagram of a display module of a soil detector according to one embodiment of the present application.

In some embodiments of the present application, as shown in FIG. 8, the circuit board 120 is further provided with a display module, which may employ an LCD screen. The display module is connected to the non-volatile microcontroller unit for displaying soil detection parameters and operation states of the soil detector. In some embodiments of the present application, the display module may provide a backlight whose backlight display brightness is adjusted with the intensity of the illumination detected by the illumination detection branch 720 so as to be viewable by an operator.

In summary, the soil detector of the present application includes a housing, a circuit board, and a probe; the circuit board is provided within the housing, and the probe extends into the housing and is electrically connected to the circuit board; a detection electrode is provided on the probe; a soil detection circuit is provided on the circuit board; when soil pH detection is performed, the probe is inserted into soil, and the soil detection circuit reads a time-varying amount of an electromotive force formed by the detection electrode in the soil by outputting a square wave alternating current voltage to the detection electrode, and determines a pH of the soil based on the time-varying amount of the electromotive force. By loading the square wave alternating current voltage on the detection electrode of the probe, the present application realizes dynamic balance of a polarity of a power supply of the detection electrode, reduces a polarization speed of the detection electrode, can maintain a precise working state of the probe for a long period of time, and facilitates repairing and maintenance of the probe. Meanwhile, since the present application determines the pH parameters based on the time-varying amount of the electromotive force formed by the detection electrode under the square wave alternating current voltage, an absolute value is replaced with a change amount of a relative value of the electromotive force, thus, effects of a decrease in battery power are avoided, and it is not necessary to repeatedly perform battery voltage calibration. Therefore, the detection stability and precision are higher, and more convenience is brought to use.

The above descriptions are only specific embodiments of the present application, and under the foregoing teaching of the present application, a person skilled in the art may make other improvements or changes based on the foregoing embodiments. Those skilled in the art should be aware that the specific description is only for better explaining the purpose of the present application, and the scope of protection of the present application shall be subject to the scope of protection of the claims.

What is claimed is:

1. A soil detector, comprising: a housing, a circuit board, and a probe; wherein the circuit board is provided within the housing, and the probe extends into the housing and is electrically connected to the circuit board;
   a detection electrode is provided on the probe;
   a soil detection circuit is provided on the circuit board;
     when soil pH detection is performed, the probe is inserted into soil, and the soil detection circuit is configured to read a time-varying amount of an electromotive force formed by the detection electrode in the soil by outputting a square wave alternating current voltage to the detection electrode, and determines a pH of the soil based on the time-varying amount of the electromotive force;
   wherein the detection electrode comprises a first electrode provided at a front end of the probe and a second electrode provided at a root of the probe, and the first electrode and the second electrode are made of different metal materials;
   the soil detection circuit comprises a non-volatile microcontroller unit and a pH detection branch; two alternating current power supply output terminals of the non-volatile microcontroller unit are connected to the first electrode and the second electrode, respectively, to output the square wave alternating current voltage to the first electrode and the second electrode;
   the pH detection branch comprises a reference voltage module and a pH value acquisition module; and
   the reference voltage module comprises a first pull-up resistor (R16) and a voltage-regulator diode (U2); the first pull-up resistor (R16) and the voltage-regulator diode (U2) are grounded in series from a power supply positive terminal, and a reference voltage terminal is provided for the pH value acquisition module by the voltage-regulator diode (U2); the pH value acquisition module comprises a first resistor (R9), a second resistor (R10), and a filter capacitor (C6); a first terminal of the first resistor (R9) is connected to the first electrode, a second terminal is connected to a first terminal of the second resistor (R10), a second terminal of the second resistor (R10) is connected to the reference voltage terminal, and a connection terminal of the first resistor (R9) and the second resistor (R10) is connected to a pH detection terminal of the non-volatile microcontroller unit, and is grounded through the filter capacitor (C6).

2. The soil detector according to claim 1, wherein the non-volatile microcontroller unit has stored therein executable instructions that, when executed, cause the non-volatile microcontroller unit to perform clipping filtering and debouncing filtering on electrical signals acquired from the pH detection branch.

3. The soil detector according to claim 1, wherein the soil detection circuit further comprises a moisture detection branch; the moisture detection branch comprises a third resistor (R17) and a fourth resistor (R6); a first terminal of the third resistor (R17) is connected to the second electrode and a first terminal of the fourth resistor (R6), a second terminal of the third resistor (R17) is grounded, and a second terminal of the fourth resistor (R6) is connected to a moisture detection terminal of the non-volatile microcontroller unit; when soil moisture detection is performed, the first electrode is connected to the power supply positive terminal.

4. The soil detector according to claim 3, wherein the detection electrode further comprises a third electrode provided at a middle portion of the probe;

the soil detection circuit further comprises a fertility value detection branch; the fertility value detection branch comprises a fifth resistor (R19) and a sixth resistor (R18); a first terminal of the sixth resistor (R18) is connected to the power supply positive terminal, a second terminal is connected to the third electrode and a first terminal of the fifth resistor (R19), and a second terminal of the fifth resistor (R19) is connected to a fertility value detection terminal of the non-volatile microcontroller unit; when soil fertility value detection is performed, the first electrode is connected to the power supply positive terminal.

5. The soil detector according to claim 4, wherein the soil detection circuit further comprises four sets of toggle switches; a common terminal of first toggle switch is connected to the first electrode, a first moving terminal is connected to the power supply positive terminal, and a second moving terminal is connected to the first terminal of the first resistor (R9) and one alternating current power supply output terminal of the non-volatile microcontroller unit; a common terminal of second toggle switch is connected to the second electrode, a first moving terminal is connected to the first terminal of the fourth resistor (R6), and a second moving terminal is connected to another alternating current power supply output terminal of the non-volatile microcontroller unit; a common terminal of third toggle switch is grounded, a first moving terminal is connected to the non-volatile microcontroller unit, and a second moving terminal is suspended; a common terminal of fourth toggle switch is connected to the non-volatile microcontroller unit, a first moving terminal is connected to the second terminal of the fourth resistor (R6), and a second moving terminal is connected to the second terminal of the fifth resistor (R19); wherein the first toggle switch, the second toggle switch and the third toggle switch are linked.

6. The soil detector according to claim 1, wherein the circuit board is further provided with a power supply circuit and an on-off key;

the on-off key is grounded and turned on when pressed, the on-off key is connected to a power supply detection terminal of the non-volatile microcontroller unit, and the power supply detection terminal is connected to the power supply positive terminal via a second pull-up resistor (R29);

the power supply circuit is a zero power consumption circuit, comprising an anti-reverse diode (D1), a first transistor (Q1), a second transistor (Q2), a voltage stabilizing chip (U1) and a plurality of resistors; a battery positive electrode is connected to an emitter of the second transistor (Q2) through the anti-reverse diode (D1); a base of the second transistor (Q2) is connected to an output terminal of the anti-reverse diode (D1) via a seventh resistor (R27), and is connected to the on-off key via a eighth resistor (R24) and a ninth resistor (R28) in series, and a collector of the second transistor (Q2) is connected to the voltage stabilizing chip (U1); a collector of the first transistor (Q1) is connected to a connection terminal of the eighth resistor (R24) and the ninth resistor (R28), an emitter of the first transistor (Q1) is grounded, and a base of the first transistor (Q1) is connected to the non-volatile microcontroller unit via a tenth resistor (R25) and is grounded via a eleventh resistor (R26).

7. The soil detector according to claim 1, wherein the circuit board is further provided with a Bluetooth module, and the Bluetooth module is connected to the non-volatile microcontroller unit for allowing the soil detector to communicate with an external Bluetooth device.

8. The soil detector according to claim 1, wherein the circuit board is further provided with an auxiliary detection circuit, and the auxiliary detection circuit comprises a temperature detection branch, an illumination detection branch and a battery voltage detection branch, and the temperature detection branch, the illumination detection branch and the battery voltage detection branch are all electrically connected to the non-volatile microcontroller unit.

9. The soil detector according to claim 8, wherein a display module is further provided on the circuit board, and the display module is connected to the non-volatile microcontroller unit for displaying soil detection parameters and operation states of the soil detector, and display brightness of the display module is adjusted with illumination intensity detected by the illumination detection branch.

* * * * *